United States Patent
Piercy et al.

(10) Patent No.: US 7,920,688 B1
(45) Date of Patent: Apr. 5, 2011

(54) SERVICE VARIATION SELECTION

(75) Inventors: Larry H. Piercy, St. Joseph, MO (US);
Trey A. Hilyard, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1074 days.

(21) Appl. No.: 11/531,022

(22) Filed: Sep. 12, 2006

(51) Int. Cl.
*H04M 3/42* (2006.01)

(52) U.S. Cl. ............ 379/207.11; 379/201.02; 455/414.2

(58) Field of Classification Search ............. 379/207.02, 379/207.11; 455/414.3, 414.1
See application file for complete search history.

(56) References Cited

U.S. PATENT DOCUMENTS

| | | | | |
|---|---|---|---|---|
| 6,453,161 B1 * | 9/2002 | Touati et al. | .................. | 455/433 |
| 2004/0247092 A1 * | 12/2004 | Timmins et al. | ........... | 379/88.16 |
| 2005/0085221 A1 * | 4/2005 | Sumcad | ........................ | 455/415 |

* cited by examiner

*Primary Examiner* — Creighton Smith

(57) ABSTRACT

A call processing system comprising an interface configured to receive a call request for a call from a caller to a service having a plurality of service variations and transmit a first control message, and a processing system configured to process the call request to select a first service variation of the plurality of service variations based on a first preference indicated by the caller prior to the call and generating the first control message identifying the first service variation.

19 Claims, 6 Drawing Sheets

SERVICE VARIATION SELECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of telecommunications, and in particular, to selecting a service variation based on caller preference determined prior to a call.

2. Description of the Prior Art

Abbreviated dialing codes are typically offered by telecommunication carriers to customers to simplify the dialing process for certain services. An abbreviated dialing code often times takes the form of a three-digit code. In some cases, the digits are preceded by a symbol, such as the "*" or "#" symbols. Specialized equipment in carrier networks recognize the abbreviated dialing codes, when dialed, and handle calls accordingly.

Often times, abbreviated dialing codes can be dialed by users to reach a general service that is implemented at a local level. However, the determination of which local variation of a general service to select for a call is typically made based on a call characteristic that is itself determined after the call is placed.

In a common example, many local media outlets market abbreviated dialing codes to callers. For instance, a caller may be able to dial an abbreviated dialing code, such as *-9-5-0, to reach the studio phone line of a radio station that broadcasts over the 950AM carrier frequency.

In such cases, abbreviated dialing codes are assigned by the telecommunication carriers at a local level. That is, abbreviated dialing codes are re-used from market to market, just as AM radio carrier frequencies are commonly reused across multiple markets.

Specifically, the mobile switching centers (MSCs) servicing various markets include translations tables. The translations tables in each MSC are uniquely configured for a particular market. Thus, a call placed in one market to an abbreviated dialing code will be routed by an MSC to a destination in that market, while a different call placed in another market to the same abbreviated dialing code will be routed by another MSC to a different, market specific destination. The call characteristic used to route the call is the present location of the caller and is therefore inherently determined after the call is placed to the network.

In another example, a caller in need of emergency services can dial "911" to reach an emergency service. Depending upon the location of the caller, a particular public safety answer point (PSAP) will respond to the call. The specific PSAP can be considered a local variation of a general service. The PSAP is generally selected based on the actual location of the caller. Again, the location of the caller is inherently determined after the call is placed to the network.

In another example, a caller can dial "411" to reach an information service. A call to an information services is usually routed to a voice response unit that prompts the caller for the desired geographic location with which to associate the subsequent information request. The call is then routed to a location-appropriate call agent for further call servicing. In this example, the information service could be considered a general service, while specific implementation of the service by the geographically relevant call agent could be considered a local variation of the service.

SUMMARY OF THE INVENTION

An embodiment of the invention advances the art by providing methods, systems, and software that determine which local variation of a general service to select for a call based on a preference indicated by a caller prior to the caller making a call. In this manner, callers can place calls to a general service, such as a national media outlet. The caller can advantageously be connected to a preferred local variation of the general service, such as a local affiliate station, rather than be connected to the default local variation of the locality from which the caller is placing the call.

In an embodiment of the invention, a method of operating a call processing system comprises receiving a call request for a call from a caller to a service having a plurality of service variations, selecting a first service variation of the plurality of service variations based on a first preference indicated by the caller prior to the call, generating a first control message identifying the first service variation, and transmitting the first control message.

In an embodiment of the invention, the service comprises a national media service.

In an embodiment of the invention, the plurality of service variations comprise a plurality of local affiliates of the national media service.

In an embodiment of the invention, the first preference comprises a first local affiliate of the plurality of local affiliates of the national media service.

In an embodiment of the invention, the call request indicates an abbreviated dialing code (ADC).

In an embodiment of the invention, the ADC includes digits associated with an acronym of the national media service.

In an embodiment of the invention, the control message comprises routing instructions for routing the call to the first local affiliate.

In an embodiment of the invention, a call processing system comprises an interface configured to receive a call request for a call from a caller to a service having a plurality of service variations and transmit a first control message, and a processing system configured to process the call request to select a first service variation of the plurality of service variations based on a first preference indicated by the caller prior to the call and generating the first control message identifying the first service variation.

In an embodiment of the invention, a software product for operating a call processing system comprises software operational when executed by a processing system to direct the call processing system to receive a call request for a call from a caller to a service having a plurality of service variations and transmit a first control message, process the call request to select a first service variation of the plurality of service variations based on a first preference indicated by the caller prior to the call, generate the first control message identifying the first service variation, and transmit the first control message, and a storage medium configured to store the software.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
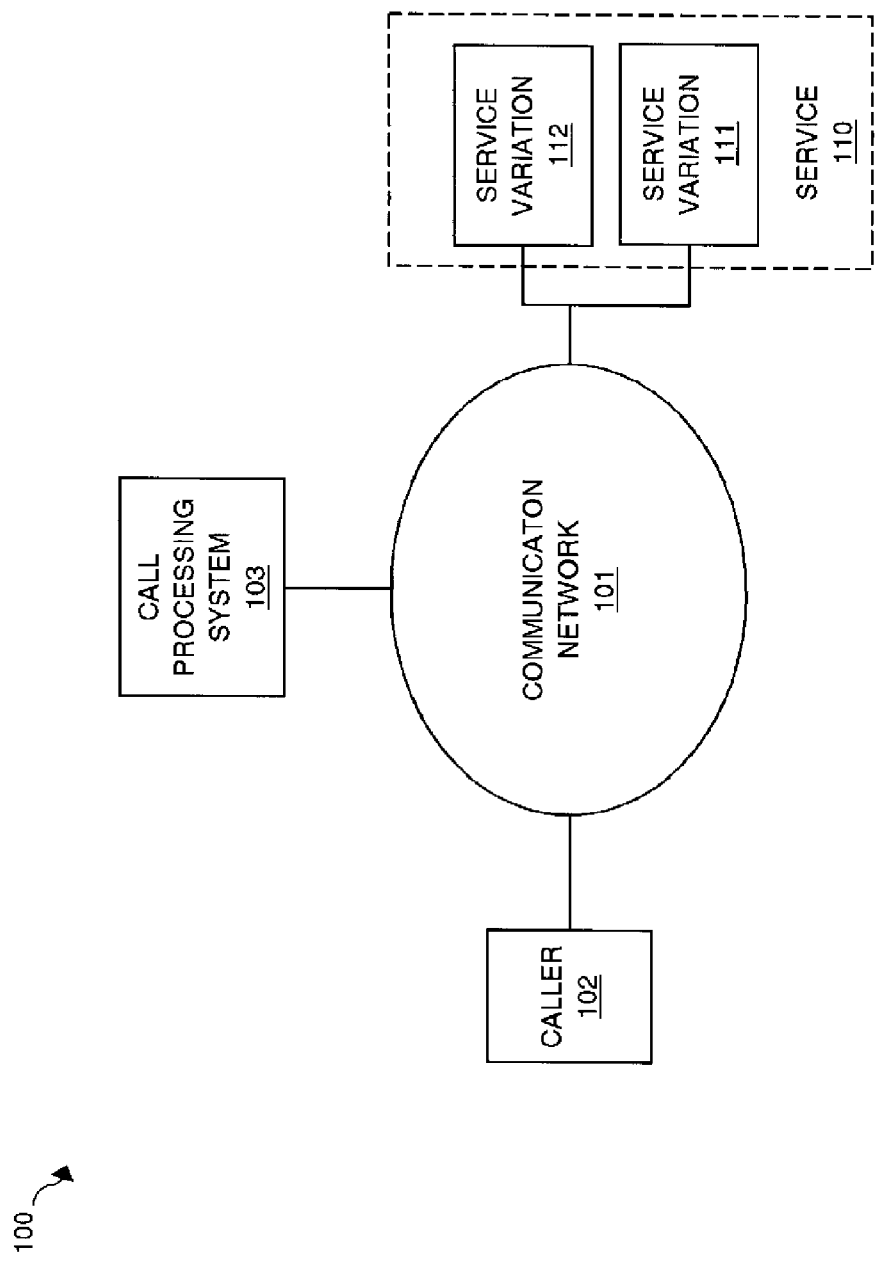
FIG. 1 illustrates a communication network.

FIG. 1 illustrates communication network 100 in an embodiment of the invention. Communication network 100 includes communication network 101, caller 102, call processing system 103, and service 110. Service 110 includes service variation 111 and service variation 112. Caller 102 is operatively connected to communication network 101. Likewise, CPS 103 is operatively connected to communication network 101. Service variation 111 and service variation 112 are also operatively connected to communication network 101.

Service 110 could be any general service that could be implemented in multiple variations. Service variation 111 could be a variation of a general service, such as service 110. Service variation 112 could be a different variation of the general service, such as service 110. Communication network 101 could be any well known communication network or collection of communication networks. Caller 101 could be any caller or caller system capable of placing calls or otherwise accessing service 110 through either service variation 111 or 112 over communication network 101. Caller 102 could also be any caller or caller system capable of communicating with call processing system 103 to setup calls or service sessions with service 110. Call processing system 103 could be any system capable of communicating with caller 102 to setup calls or service sessions with service 110.

Figure 2:
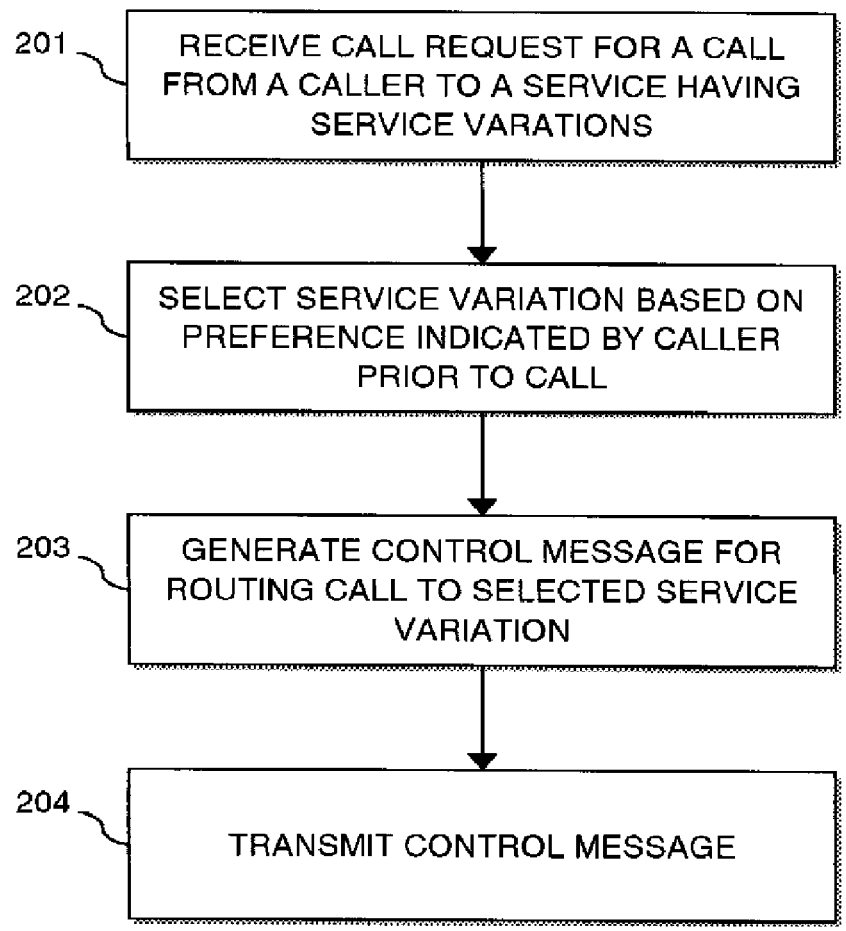
FIG. 2 illustrates the operation of a call processing system.

FIG. 2 illustrates the operation of call processing system 103 in an embodiment of the invention. To begin, call processing system 103 receives a call request for a call from caller 102 to service 110 (Step 210). Call processing system 103 processes the call request to select either service variation 111 or service variation 112 based on a preference indicated by caller 102 prior to the call (Step 220). The caller preference could be stored in a database system accessible by call processing system 103. The caller preference could be stored in association with a caller identifier, in a caller profile, or in some other manner well known in the art.

Next, call processing system 103 generates a control message for routing the call to the selected variation (Step 203). For exemplary purposes, it could be assumed that service variation 111 is the selected service variation. Under such circumstances, call processing system 103 could generate a control message for routing the call to service variation 111.

Lastly, call processing system 103 transmits the control message (Step 204). It should be understood that call processing system 103 could transmit the control message to caller 102, communication network 101, or service variation 111, or to any combination thereof. Additionally, it should be understood that call processing system 103 could transmit the control message internally, such as to an internal routing or switching system. Other variations are possible.

Figure 3:
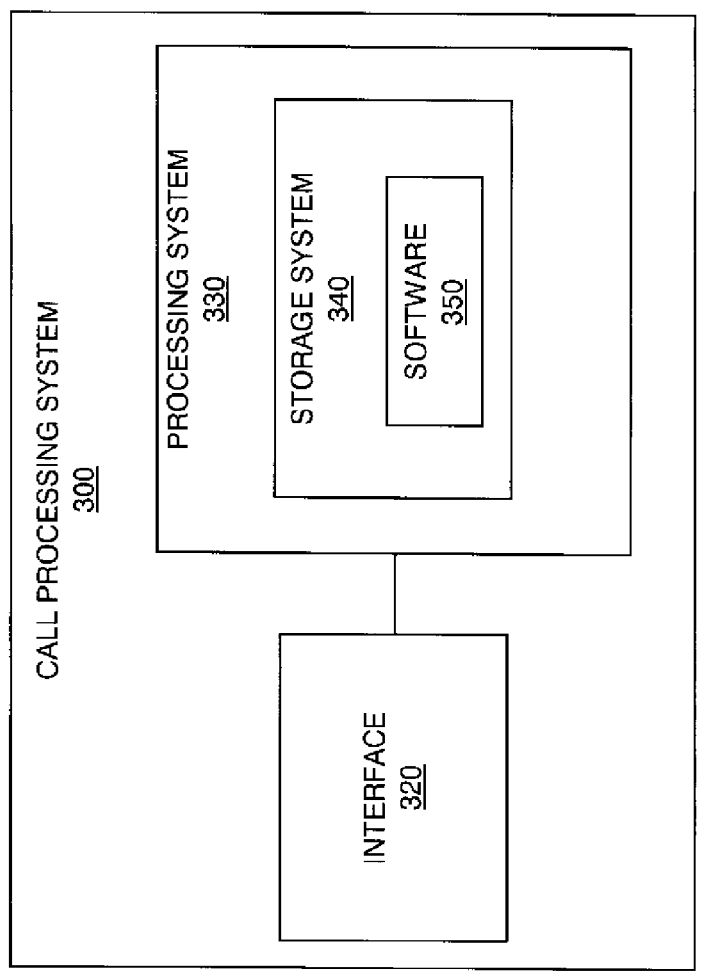
FIG. 3 illustrates a call processing system.

FIG. 3 illustrates call processing system 300 in an embodiment of the invention. Call processing system 300 includes interface 320, processing system 330, storage system 340, and software 350. Storage system 340 stores software 350. Processing system 330 is linked to interface 320. Call processing system 300 could be comprised of a programmed general-purpose computer, although those skilled in the art will appreciate that programmable or special purpose circuitry and equipment may be used. Call processing system 300 may use a client server architecture where operations are distributed among a server system and client devices that together comprise elements 320-350.

Interface 320 could comprise a network interface card, modem, port, or some other communication device. Interface 320 may be distributed among multiple communication devices. Interface 330 could comprise a computer microprocessor, logic circuit, or some other processing device. Processing system 330 may be distributed among multiple processing devices. Storage system 340 could comprise a disk, tape, integrated circuit, server, or some other memory device. Storage system 340 may be distributed among multiple memory devices.

Processing system 330 retrieves and executes software 350 from storage system 340. Software 350 may comprise an operating system, utilities, drivers, networking software, and other software typically loaded onto a general-purpose computer. Software 350 could also comprise an application program, firmware, or some other form of machine-readable processing instructions. When executed by the processing system 330, software 350 directs processing system 330 to operate as described for call processing system 103.

Figure 4:
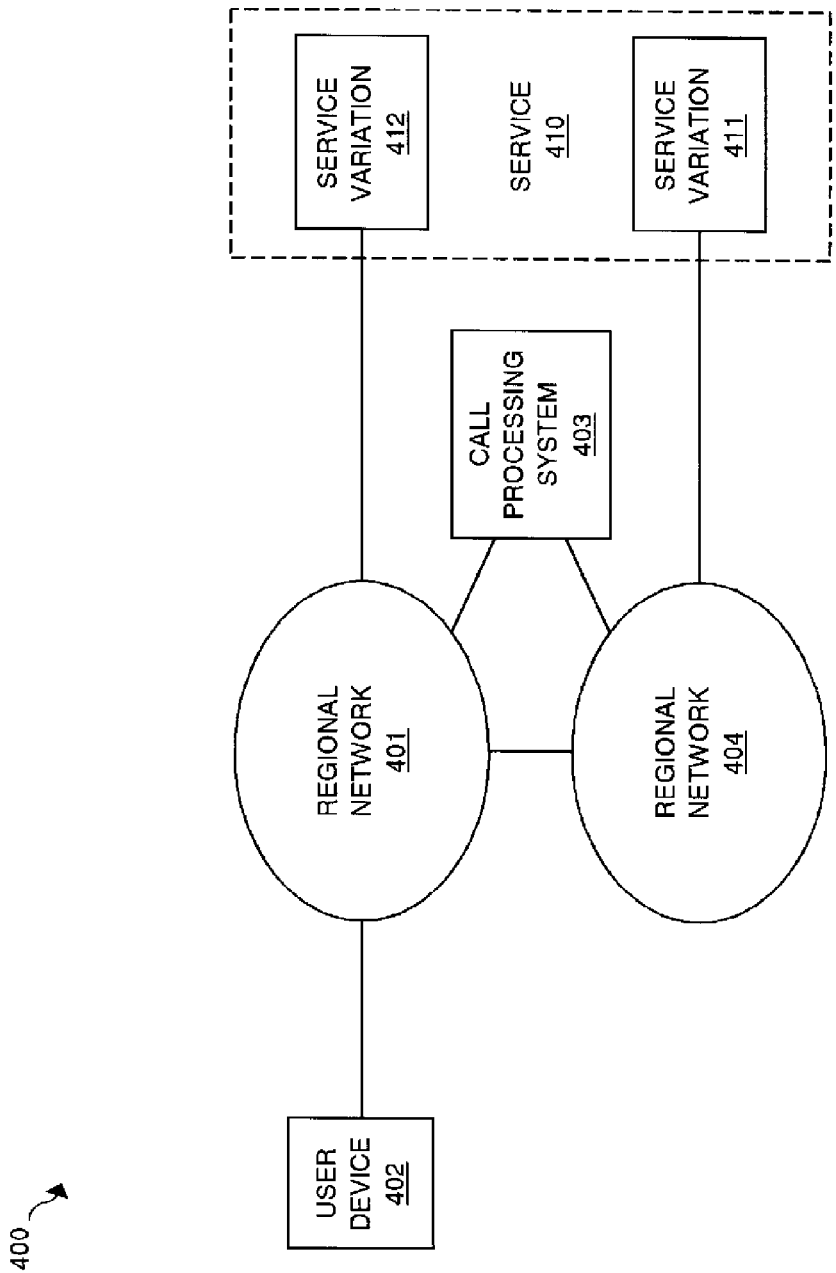
FIG. 4 illustrates a communication network.

FIG. 4 illustrates communication network 400 in an embodiment of the invention. Communication network 400 includes user device 402, regional network 401, regional network 404, call processing system 403, and service 410. Service 410 includes service variation 411 and service variation 412.

User device 402 is operatively coupled to regional network 401. Regional network 401 is operatively coupled to call processing system 403, service variation 412, and regional network 404. Regional network 404 is operatively coupled to regional network 401 and service variation 411.

Service 410 could be any general service that could be implemented in multiple variations. Service variation 411 could be a variation of a general service, such as service 410. Service variation 412 could be a different variation of the general service, such as service 410.

User device 402 could be any device capable of communicating with service variation 411 or 412 over regional network 401 or regional network 404. Additionally, user device 402 could be any device capable of communicating with call processing system 403. User device 402 could be, for example, a mobile phone, personal computer, personal digital assistant, music or video device, as well as other types of user devices. User device 402 could be a wireline or wireless device, as well as a combination thereof.

Regional network 401 could be any network or collection of networks configured to handle calls to and from a particular region, such as a metro area, a county, or a state. Likewise, regional network 401 could be any other network or collection of networks configured to handles calls to and from a different region, such as a metro area, a county, or a state. Call processing system 403 could provide call control functions over calls placed to or from either regional network 401, 404, or both. Regional networks 401 could be wireline or wireless networks, as well as a combination thereof.

Call processing system 403 could be any system or collection of systems capable of communicating with user device 402 to setup calls from user device to service 410. Call processing system 403 could be, for example, a mobile switching center (MSC), a soft-switch, or a media gateway controller, as well as other types of call control or call processing systems.

Call processing system 403 could include an interface, a processing system, a storage system, and software. The storage system could store software. The processing system could be linked to the interface. Call processing system 403 could be comprised of a programmed general-purpose computer, although those skilled in the art will appreciate that programmable or special purpose circuitry and equipment may be used. Call processing system 403 may use a client server architecture where operations are distributed among a server system and client devices that together comprise call processing system 403.

The interface could comprise a network interface card, modem, port, or some other communication device. The interface may be distributed among multiple communication devices. The interface could comprise a computer microprocessor, logic circuit, or some other processing device. The processing system may be distributed among multiple processing devices. The storage system could comprise a disk, tape, integrated circuit, server, or some other memory device.

The storage system may be distributed among multiple memory devices. The processing system retrieves and executes the software from the storage system.

The software may comprise an operating system, utilities, drivers, networking software, and other software typically loaded onto a general-purpose computer. The software could also comprise an application program, firmware, or some other form of machine-readable processing instructions. When executed by the processing system, the software directs processing system to operate as described for call processing system 403.

Figure 5:
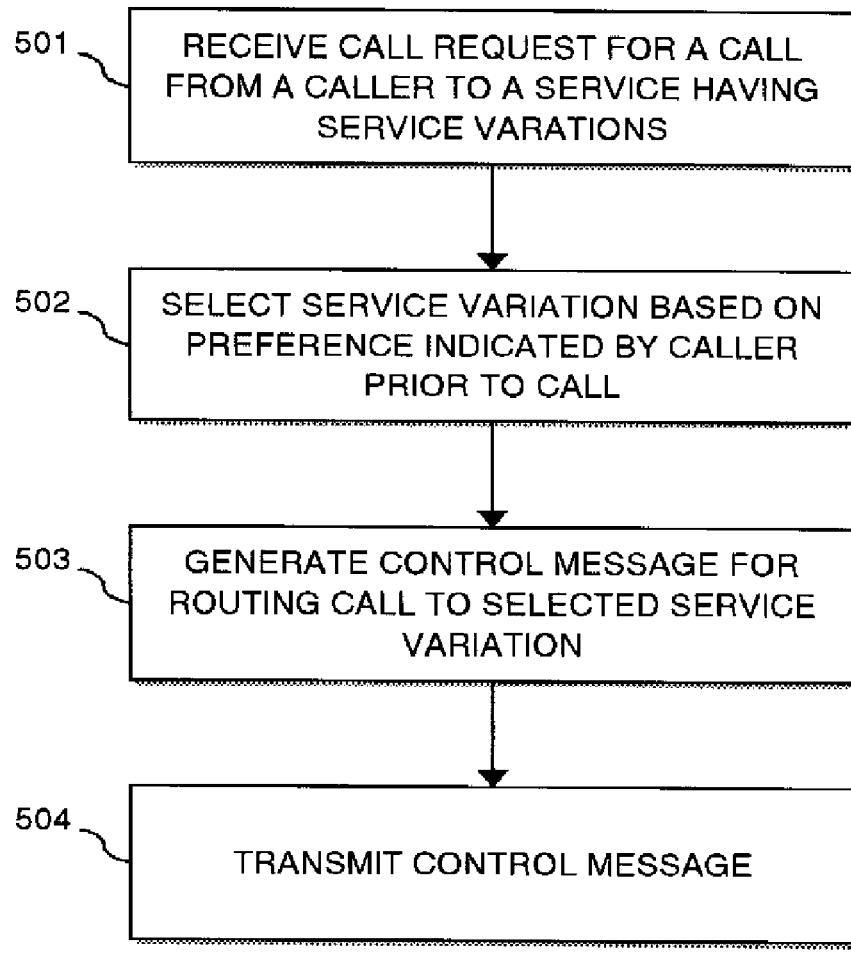
FIG. 5 illustrates the operation of a call processing system.

FIG. 5 illustrates the operation of call processing system 403 in an embodiment of the invention. In operation, a caller operating user device 402 could place a call over regional network 401. The caller could place the call by, for instance, dialing a number. The call could be to service 410. User device 402 could transmit a call request indicating the dialed number in some manner to regional network 401, such as by a call request message. Regional network 401 could transport the call request message to call processing system 403.

Referring to FIG. 5, call processing system 403 could receive the call request from the caller (Step 501). Prior to the call, such as during a subscription or registration period, the caller could determine, select, or otherwise identify a service preference related to service 410. The service preference could be stored in a database system in association with a caller identifier, a caller profile, or the like. Call processing system 403 could process the call request message to select either service variation 411 or service variation 412 based on the service preference chosen by the caller prior to the call (Step 502). Call processing system 403 could access the database system in order to select the appropriate service variation of service variations 411 or 412.

Next, call processing system 403 could generate a control message or control signaling to route the call from regional network 401 to the preferred service variation (Step 503). Call processing system 403 could then transmit the call control message or signaling (Step 504).

In an example, it could be assumed that service variation 412 is the preferred service variation. Under such circumstances, call processing system 403 could provide a control message or signaling to regional network 401, user device 402, or service variation 412, or any combination thereof, in order to route the call to service variation 412.

In another example, service variation 411 could be the preferred service variation. Under such circumstances, call processing system 403 could provide a control message or signaling to regional network 401, regional network 404, user device 402, or service variation 411, or any combination thereof, in order to route the call to service variation 411.

Figure 6:
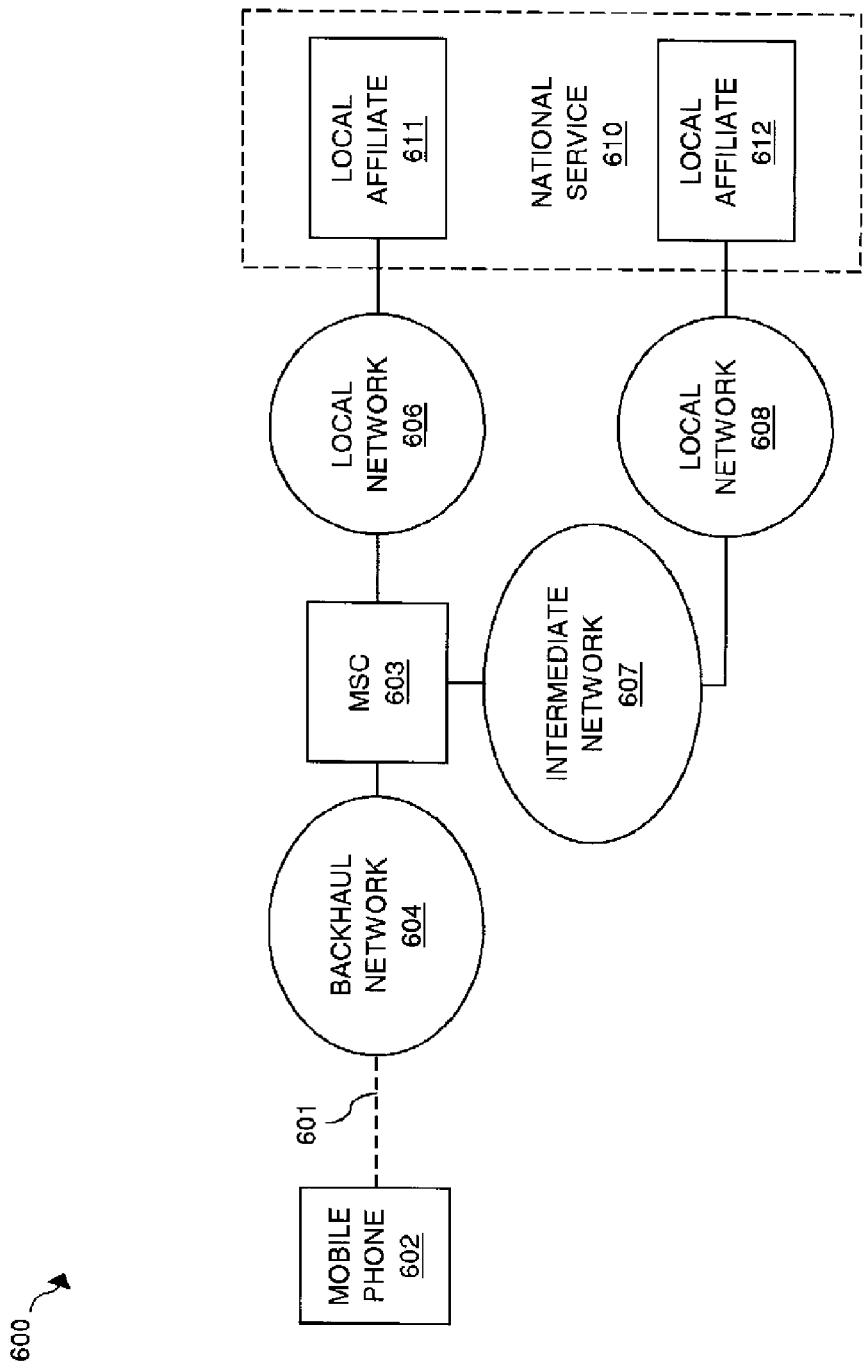
FIG. 6 illustrates a communication network.

FIG. 6 illustrates communication network 600 in an embodiment of the invention. Communication network 600 includes mobile phone 602, backhaul network 604, mobile switching center (MSC) 603, local network 606, intermediate network 607, local network 608, and national service 610. National service includes local affiliate 611 and local affiliate 612.

User device 602 is operatively coupled to backhaul network 604. Backhaul network is operatively coupled to MSC 603. MSC 603 is operatively coupled to intermediate network 607 and local network 606. Local network 606 is operatively coupled to local affiliate 611. Intermediate network 607 is also operatively coupled to local network 608. Local network 608 is also operatively coupled to local affiliate 612. It should be understood that intermediate network 607 could also be coupled to local network 606.

Mobile phone 602 communicates with MSC 603 over wireless link 601 and backhaul network 604. Wireless link 601 could be any type of wireless radio frequency link over which mobile phone 602 communicates with backhaul network 604 and MSC 603 in accordance with a wireless communication protocol, such as code division multiple access (CDMA), as well as any variation of CDMA. Other wireless communication protocols that could be used include time division multiple access (TDMA), global system for mobile communications (GSM), and worldwide interoperability for microwave access (WiMAX). Other wireless protocols are possible.

Backhaul network 604 could be any network or collection of networks capable of receiving and transporting communications between wireless link 601 and MSC 603. Backhaul network 604 could be comprised up, for example, a T-1 link, an Ethernet link over a cable multi-system operator (MSO), or the like.

Local network 606 could be any network of collection of networks capable of terminating or originating calls to or from MSC 603 and local affiliate 611. Local network 607 could generally serve a local area, such as a metro, county, or state region. Intermediate network 607 could be any network or collection of networks capable of linking MSC 603 with local network 608. Local network 608 could be any network of collection of networks capable of terminating or originating calls to or from intermediate network 607 and local affiliate 612. Local network 608 could generally serve a local area, such as a metro, county, or state region. Local networks 606 and 608 could be considered local exchange carriers (LECs) or competitive local exchange carriers (CLECS). Intermediate network 607 could be considered an inter-exchange carrier.

In operation, a user operating mobile phone 602 places a call to national service 610. National service 610 could be any general service that could be implemented in multiple variations, such as a media broadcasting service. Local affiliate 611 could be a local affiliate of the national media broadcasting service, national service 610. Likewise, local affiliate 612 could also be a local affiliate of national service 610. Local affiliate 611 could service one geographic region, while local affiliate 612 could service another, different geographic region. In one example, local affiliates 611 and 612 could be television stations.

Further in operation, the user operating mobile phone 602 could place the call by dialing an abbreviated dialing code. In one example, the abbreviated dialing code could be based on or associated with an acronym of national service 610. For instance, national service 610 could be the National Broadcasting Corporation, otherwise known by the acronym or call letters N-B-C. Other national services are possible, such as ABC, CBS, FOX, or ESPN. The user could dial N-B-C, *-N-B-C, #-N-B-C, or any combination or variation thereof. The digits of a typical mobile phone keypad associated with the acronym N-B-C could be 6-2-2. Thus, a user could dial 6-2-2, *-6-2-2, or #-6-2-2, or any combination or variation thereof in order to reach national service 610.

Prior to making the call, such as during a subscription or registration period, the user could choose, select, or otherwise determine a preferred affiliate of national service 610. The user's selection could be stored in a user or caller database in the form of a user profile, within a translations table, or the like.

Upon the user initiating the call, mobile phone 602 transmits a call request message over backhaul network 604 to MSC 603 indicating the dialed abbreviated dialing code. Continuing with the example from above, the abbreviated dialing code could be *-6-2-2. MSC 603 include a routing, translations, or pre-translations database that collectively store abbreviated dialing codes in association with call treatment or handling instructions, as well as in association with routing instructions. Such tables or databases are well known in the art.

In response to receiving the call request message, MSC 603 could process the abbreviated dialing code using a pre-translations database or table to determine how to handle the call. In the case of some abbreviated dialing codes not associated with national service 610, MSC 603 could directly access a routing or translations table to determine how to route the call. In the case of a call to an abbreviated dialing code associated with national service 610, the pre-translations table could instruct the MSC 603 to perform a look-up to the user or caller database using the identity of the caller or calling device to determine a local preference for national service 610.

In this embodiment, local affiliate 611 and 612 are illustrated as two possible local preferences. Assuming for the sake of illustration that the caller had selected local affiliate 612 as his preferred local service, MSC 603 could then access a routing or translations database or table to determine routing instructions for the call. MSC 603 could then execute the routing instructions internally, such as by switching and routing the call to the appropriate network. In this case, the call could be routed to intermediate network 607. MSC 603 could also generate the appropriate call signaling, such as an SS7 initial address message, and transmit the signaling to intermediate network 607. Intermediate network 607 could then connect the call to local network 608, including forwarding the signaling to local network 608. Local network 608 could connect the call to local affiliate 612.

It should be understood that local affiliate 612 could comprise a physical plant capable of receiving calls. For example, local affiliate 612 could include multi-media servers capable of terminating calls and playing out media to callers over a call connection or session.

What is claimed is:

1. A method of operating a call processing system, the method comprising:
    receiving a call request indicating an abbreviated dialing code (ADC) for a call from a caller located in a first geographic region to a national broadcasting media service having a plurality of local affiliates in a plurality of different geographic regions;
    processing the call request to select a first preferred local affiliate of the plurality of local affiliates based on a first preference indicated by the caller prior to the call, wherein the preferred local affiliate is located in a second geographic region different from the first geographic region;
    generating a routing instruction for routing the call from the caller located in the first geographic region to the preferred local affiliate located in the second geographic region; and
    transmitting the routing instruction.

2. The method of claim 1 wherein the first geographic region and the second geographic region are mutually exclusive.

3. The method of claim 2 wherein the processing the call request to select the preferred local affiliate further comprises associating the call request with a caller profile, and wherein the caller profile indicates the preferred local affiliate of the plurality of local affiliates of the national broadcasting media service.

4. The method of clam 1 further comprising processing the call request to select the preferred local affiliate during one of a subscription period or a registration period.

5. The method of claim 3 further comprising associating the call request with the caller profile based on an identity of the caller.

6. The method of claim 3 wherein the ADC includes digits comprising a numerical representation associated with an acronym of the national broadcasting media service.

7. The method of claim 3 further comprising associating the call request with the caller profile based on an identity of a calling device operated by the caller.

8. A call processing system comprising:
    an interface configured to receive a call request indicating an abbreviated dialing code (ADC) for a call from a caller located in a first geographic region to a national broadcasting media service having a plurality of local affiliates in a plurality of different geographic regions, and to transmit a routing instruction; and
    a processing system configured to process the call request to select a preferred local affiliate of the plurality of local affiliates based on a first preference indicated by the caller prior to the call, and to generate the routing instruction for routing the call from the caller located at the first geographic region to the preferred local affiliate located in a second geographic region that is different from the first geographic region.

9. The call processing system of claim 8 wherein the first geographic region and the second geographic region are mutually exclusive.

10. The call processing system of claim 9 further configured to associate the call request with a caller profile that indicates the preferred local affiliate of the plurality of local affiliates of the national broadcasting media service.

11. The call processing system of claim 8 further configured to process the call request to select a preferred local affiliate during one of a subscription period or a registration period.

12. The call processing system of claim 10 further configured to associate the call request with the caller profile based on an identify of the caller.

13. The call processing system of claim 10 wherein the ADC includes digits comprising a numerical representation associated with an acronym of the national broadcasting media service.

14. The call processing system of claim 10 wherein the further configured to associate the call request with the caller profile based on an identity of a calling device operated by the caller.

15. A software product for operating a call processing system, the software product comprising:
  software operational when executed by a processing system to direct the call processing system to receive a call request indicating an abbreviated dialing code (ADC) for a call from a caller located in a first geographic region to a national broadcasting media service having a plurality of local affiliates in a plurality of different geographic regions, to process the call request to select a first preferred local affiliate of the plurality of local affiliates based on a first preference indicated by the caller prior to the call, to generate a routing instruction for routing the call from the caller located in the first geographic region to the preferred local affiliate located in a second geographic region that is different from the first geographic region, and to transmit the routing instruction; and
  a storage medium configured to store the software.

16. The method of claim 1 wherein the preferred local affiliate comprises a physical presence including one or more multi-media servers configured to provide broadcast media via call connections.

17. The method of claim 16 further comprising:
  routing the call from the from the caller located in the first geographic region to the preferred local affiliate located in the second geographic region, resulting in a call connection; and
  providing audio broadcast media to the caller via the call connection.

18. The call processing system of claim 8 wherein the preferred local affiliate comprises a physical presence including one or more multi-media servers configured to provide broadcast media via call connections.

19. The call processing system of claim 18 wherein the processing system is further configured to route the call from the caller located in the first geographic region to the preferred local affiliate located in the second geographic region, resulting in a call connection, and provide audio broadcast media from the preferred local affiliate to the caller via the call connection.

* * * * *